United States Patent
Tojigamori

(10) Patent No.: US 12,555,787 B2
(45) Date of Patent: Feb. 17, 2026

(54) FLUORIDE ION BATTERY AND METHOD FOR PRODUCING FLUORIDE ION BATTERY

(71) Applicant: TOYOTA JIDOSHA KABUSHIKI KAISHA, Toyota (JP)

(72) Inventor: Takeshi Tojigamori, Yamato (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 536 days.

(21) Appl. No.: 18/143,692

(22) Filed: May 5, 2023

(65) Prior Publication Data

US 2024/0014393 A1    Jan. 11, 2024

(30) Foreign Application Priority Data

Jul. 5, 2022 (JP) .................. 2022-108261

(51) Int. Cl.
*H01M 4/58* (2010.01)
*H01M 10/0562* (2010.01)
*H01M 10/44* (2006.01)
*H01M 4/02* (2006.01)

(52) U.S. Cl.
CPC ......... *H01M 4/58* (2013.01); *H01M 10/0562* (2013.01); *H01M 10/44* (2013.01); *H01M 2004/027* (2013.01); *H01M 2300/008* (2013.01)

(58) Field of Classification Search
CPC ............ H01M 10/0562; H01M 10/44; H01M 2004/027; H01M 2300/008; H01M 4/58; H01M 4/582; Y02E 60/10; Y02P 70/50
See application file for complete search history.

(56) References Cited

U.S. PATENT DOCUMENTS 10,727,487 B2 * 7/2020 Omichi ............... H01M 4/1397

FOREIGN PATENT DOCUMENTS

JP     2020-191252 A    11/2020

* cited by examiner

*Primary Examiner* — Victoria H Lynch
(74) *Attorney, Agent, or Firm* — Oliff PLC

(57) ABSTRACT

The present disclosure provides a fluoride ion battery comprising a negative electrode active material that can exhibit high charge-discharge capacity, as well as a method for producing it. The fluoride ion battery of the disclosure has $La_xC_{(1.00-x)}$ as the negative electrode active material, where $0.00<x<1.00$. The production method of the disclosure includes discharging a fluoride ion battery precursor having $La_xC_{(1.00-x)}$ as the negative electrode active material, where $0.00<x<1.00$, until the upper limit potential of the negative electrode reaches 2.5 to 3.5 V vs $Pb/PbF_2$.

6 Claims, 3 Drawing Sheets

FLUORIDE ION BATTERY AND METHOD FOR PRODUCING FLUORIDE ION BATTERY

FIELD

The present disclosure relates to a fluoride ion battery and to a method for producing the fluoride ion battery.

BACKGROUND

PTL 1 discloses a fluoride ion battery comprising a positive electrode active material layer, a negative electrode active material layer, and an electrolyte layer formed between the positive electrode active material layer and negative electrode active material layer, wherein the negative electrode active material layer comprises a negative electrode active material including Si element and La element and the solid electrolyte includes La element, Ba element and F element.

CITATION LIST

Patent Literature

[PTL 1] Japanese Unexamined Patent Publication No. 2020-191252

SUMMARY

Technical Problem

It is desirable for a fluoride ion battery to have high charge-discharge capacity.

The object of the present disclosure is to provide a fluoride ion battery comprising a negative electrode active material that can exhibit high charge-discharge capacity, as well as a method for producing it.

Solution to Problem

The present inventors have found that the aforementioned object can be achieved by the means described below.
<Aspect 1>
A fluoride ion battery having $La_xC_{(1.00-x)}$ as the negative electrode active material, where $0.00<x<1.00$.
<Aspect 2>
The fluoride ion battery according to aspect 1, where $0.30 \leq x \leq 0.45$.
<Aspect 3>
The fluoride ion battery according to aspect 1 or 2, which has a lanthanoid fluoride as the solid electrolyte.
<Aspect 4>
The fluoride ion battery according to any one of aspects 1 to 3, wherein the charge-discharge capacity is 300 mAh/g or greater.
<Aspect 5>
A method for producing a fluoride ion battery, which includes discharge of a fluoride ion battery precursor having $La_xC_{(1.00-x)}$ as the negative electrode active material, where $0.00<x<1.00$, until the upper limit potential of the negative electrode reaches 2.5 to 3.5 V vs $Pb/PbF_2$.
<Aspect 6>
The method for producing a fluoride ion battery according to aspect 5, which includes charge-discharge so that the upper limit potential of the negative electrode is −0.5 V to 0.5 V vs $Pb/PbF_2$, and the lower limit potential of the negative electrode is −3.0 V to −2.0 V vs $Pb/PbF_2$, before discharge until the upper limit potential of the negative electrode reaches 2.5 V to 3.5 V vs $Pb/PbF_2$.

Advantageous Effects of Invention

According to the disclosure it is possible to provide a fluoride ion battery comprising a negative electrode active material that can exhibit high charge-discharge capacity, as well as a method for producing it.

DESCRIPTION OF EMBODIMENTS

Embodiments of the disclosure will now be described in detail. The disclosure is not limited to the embodiments described below, however, and various modifications may be implemented which do not depart from the gist thereof.
<Fluoride Ion Battery>
A fluoride ion battery of the disclosure has $La_xC_{(1.00-x)}$ as the negative electrode active material, where $0.00<x<1.00$.

The $La_xC_{(1.00-x)}$ as the negative electrode active material of the fluoride ion battery of the disclosure has a higher charge-discharge capacity than lanthanum alone.

Using $La_xC_{(1.00-x)}$ as the negative electrode active material allows oxidation-reduction reaction at a more electropositive potential than lanthanum alone. When the negative electrode is to contain a solid electrolyte, oxidation-reduction reaction at a more electropositive potential than the active material can widen the selection range for the type of solid electrolyte.

The charge-discharge capacity of the fluoride ion battery of the disclosure may be 300 mAh/g or greater. A fluoride ion battery having $La_xC_{(1.00-x)}$ as the negative electrode active material and a charge-discharge capacity of 300 mAh/g or greater can be produced by the production method of the disclosure, for example.

Figure 1:
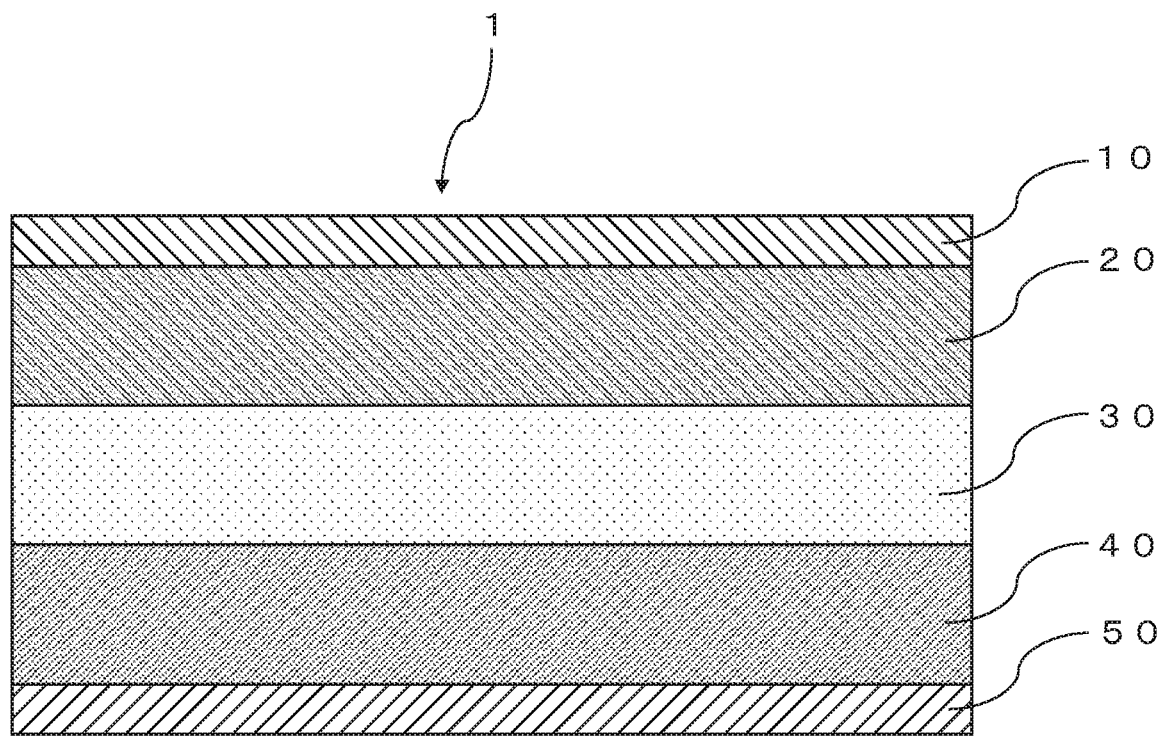
FIG. 1 is a schematic diagram showing a fluoride ion battery according to a first embodiment of the disclosure.

FIG. 1 is a schematic diagram showing a fluoride ion battery 1 according to a first embodiment of the disclosure.

The fluoride ion battery 1 of the first embodiment of the disclosure has a structure with a positive electrode collector layer 10, a positive electrode active material layer 20, an electrolyte layer 30, a negative electrode active material layer 40 and a negative electrode collector layer 50 stacked in that order. The negative electrode active material layer 40 has $La_xC_{(1.00-x)}$ as the negative electrode active material.

The fluoride ion battery of the disclosure may be a liquid battery or solid-state battery, and is most preferably an all-solid-state battery. The fluoride ion battery of the disclosure may be either a primary battery or a secondary battery. Examples of types for the fluoride ion battery of the disclosure include coin types, laminated types, cylindrical types and rectilinear types.

<Negative Electrode Active Material>

A fluoride ion battery of the disclosure has $La_xC_{(1.00-x)}$ as the negative electrode active material, where $0.00<x<1.00$. In most cases, the negative electrode active material of a fluoride ion battery releases fluorine during charge and absorbs fluorine during discharge. In other words, the negative electrode active material in the fluoride ion battery of the disclosure is $La_xC_{(1.00-x)}$ in the fully defluoridated state, but may include F depending on the charge-discharge state of the fluoride ion battery.

The relationship $0.30 \leq x \leq 0.45$ is most preferably satisfied for $La_xC_{(1.00-x)}$.

$La_xC_{(1.00-x)}$ exhibits an especially high charge-discharge capacity when x is 0.30 to 0.45. This is due to a larger metal carbide portion of the $La_xC_{(1.00-x)}$ particles when x is in this range. When x is less than 0.30 or greater than 0.45, the proportion of simple carbon or simple lanthanum in the crystals increases. The property more closely resembles simple La as x approaches 1.00.

The value of x may be 0.30 or greater, 0.31 or greater, 0.32 or greater or 0.33 or greater, and 0.45 or smaller, 0.43 or smaller, 0.41 or smaller, 0.40 or smaller.

The negative electrode active material may be in a particulate form, for example.

The mean particle diameter. (D50) of the negative electrode active material may be 0.01 up to 50 μm, for example. The mean particle diameter (D50) of the negative electrode active material may be 0.01 μm or greater, 0.05 μm or greater or 0.10 μm or greater, and 50 μm or smaller, 25 μm or smaller or 10 μm or smaller.

The mean particle diameter (D50) of the negative electrode active material can be determined from the results of particle size distribution measurement by laser diffraction scattering, for example.

The method of producing the negative electrode active material may be an arc melting method using La and C as starting materials, for example, but there is no limitation to this method.

<Solid Electrolyte>

The fluoride ion battery of the disclosure may comprise a solid electrolyte. The solid electrolyte may be any solid electrolyte that can be used in a fluoride ion battery.

Examples of solid electrolytes include fluorides of lanthanoid elements such as La and Ce, fluorides of alkali metal elements such as Li, Na, K, Rb and Cs, and fluorides of alkaline earth elements such as Ca, Sr and Ba. The solid electrolyte may also be a fluoride comprising multiple elements from among lanthanoid elements, alkali metal elements and alkaline earth elements.

Specific examples of solid electrolytes include $La_{(1-x)}Ba_xF_{(3-x)}$ ($0 \leq x \leq 1$), $Pb_{(2-x)}Sn_xF_4$ ($0 \leq x \leq 2$), $Ca_{(2-x)}Ba_xF_4$ ($0 \leq x \leq 2$) and $Ce_{(1-x)}Ba_xF_{(3-x)}$ ($0 \leq x \leq 1$). The symbol "x" in each formula may be larger than zero, such as 0.3 or greater, 0.5 or greater or 0.9 or greater. The symbol "x" may also represent a value smaller than 1, such as 0.9 or smaller, 0.5 or smaller or 0.3 or smaller. The "x" in the specific example of a solid electrolyte is of course distinct from the "x" in $La_xC_{(1.00-x)}$ for the negative electrode active material of the disclosure, the two being mutually independent values.

The form of the solid electrolyte is not particularly restricted, and may be particulate, for example.

The fluoride ion battery of the disclosure is especially useful for when a lanthanoid fluoride, i.e. a fluoride of a lanthanoid element, is used as the solid electrolyte.

A lanthanoid fluoride has relatively high fluoride ion conductivity while undergoing reductive decomposition at about the same potential as lanthanum, to deposit metallic lanthanum. Therefore, when a lanthanoid fluoride is also used as a solid electrolyte in a fluoride ion battery using metallic lanthanum as the negative electrode active material, the ion conduction paths tend to be blocked.

However, since the negative electrode active material in the fluoride ion battery of the disclosure is $La_xC_{(1.00-x)}$ which exhibits oxidation-reduction reaction at a more electropositive potential than metallic lanthanum, it is possible to inhibit reductive decomposition of lanthanoid fluorides when the battery is in use.

The lanthanoid fluoride used as the solid electrolyte may be present in the positive electrode active material layer, electrolyte layer and/or negative electrode active material layer, but most preferably it is present in the negative electrode active material layer.

<Remaining Construction>

In addition to the structure described above, the fluoride ion battery of the disclosure may also have a positive electrode collector layer, positive electrode active material layer, electrolyte layer, negative electrode active material layer and negative electrode collector layer, for example. The fluoride ion battery of the disclosure may also have a battery case housing the constituent elements.

(Positive Electrode Collector Layer)

Examples of materials for the positive electrode collector layer include stainless steel (SUS), aluminum, nickel, iron, titanium, platinum and carbon. The form of the positive electrode collector layer may be a foil, mesh or porous form.

(Positive Electrode Active Material Layer)

The positive electrode active material layer of the disclosure comprises a positive electrode active material, and optionally a solid electrolyte, a conductive aid and a binder.

The positive electrode active material of the disclosure is an active material that is usually defluoridated during discharge. Examples of positive electrode active materials include simple metals, alloys and metal oxides, as well as their fluorides. Examples of metal elements to be included in the positive electrode active material include Cu, Ag, Ni, Co, Pb, Ce, Mn, Au, Pt, Rh, V, Os, Ru, Fe, Cr, Bi, Nb, Sb, Ti, Sn and Zn. The positive electrode active material is preferably $FeF_3$, $CuF_2$, $BiF_3$ or AgF.

The content of the positive electrode active material in the positive electrode active material layer is preferably higher from the viewpoint of capacity. The mass ratio of the positive electrode active material with respect to the mass of the positive electrode active material layer may be 10 to 90 mass %, and is preferably 20 to 80 mass %.

The solid electrolyte used may be any one mentioned above under <Solid electrolyte>.

The conductive aid is not particularly restricted so long as it has the desired electron conductivity, and examples include carbon materials. Examples of carbon materials include carbon blacks such as acetylene black, Ketchen black, furnace black and thermal black, and carbon nanotubes.

The mass ratio of the conductive aid with respect to the mass of the positive electrode active material layer may be 1 to 70 mass %, and is preferably 5 to 40 mass %.

The binder is not particularly restricted so long as it is chemically and electrically stable, and examples include fluorine-based binders such as polyvinylidene fluoride (PVDF) and polytetrafluoroethylene (PTFE).

The thickness of the positive electrode layer is not particularly restricted and will differ significantly depending on the battery construction.

(Electrolyte Layer)

When the fluoride ion battery of the disclosure is a liquid battery, the electrolyte layer may be composed of an electrolyte solution and optionally a separator, for example.

The electrolyte solution may comprise a fluoride salt and an organic solvent, for example. Examples of fluoride salts include inorganic fluoride salts, organic fluoride salts and ionic liquids. Examples of inorganic fluoride salts include XF (where X is Li, Na, K, Rb or Cs). Examples of cations in organic fluoride salts include alkylammonium cations such as tetramethylammonium cation. The concentration of the fluoride salt in the electrolyte solution may be 0.1 mol % or greater and 40 mol % or lower, for example, and is preferably 1 mol % to 10 mol %.

The organic solvent of the electrolyte solution will usually be a solvent that dissolves the fluoride salt. Examples of organic solvents include glymes such as triethyleneglycol dimethyl ether (G3) and tetraethyleneglycol dimethyl ether (G4), cyclic carbonates such as ethylene carbonate (EC), fluoroethylene carbonate (FEC), difluoroethylene carbonate (DFEC), propylene carbonate (PC) and butylene carbonate (BC), and linear carbonates such as dimethyl carbonate (DMC), diethyl carbonate (DEC) and ethylmethyl carbonate (EMC). An ionic liquid may also be used as the organic solvent.

The separator is not particularly restricted so long as it has a composition that can withstand the range of use of the fluoride ion battery. Examples for the separator include polymer nonwoven fabrics such as polypropylene nonwoven fabrics and polyphenylene sulfide nonwoven fabrics, and microporous films of olefin-based resins such as polyethylene and polypropylene.

When the fluoride ion battery of the disclosure is a solid-state battery, the electrolyte layer may be a solid electrolyte layer, for example.

The solid electrolyte used may be any one mentioned above under <Solid electrolyte>.

(Negative Electrode Active Material Layer)

The negative electrode active material layer of the disclosure comprises a negative electrode active material, and optionally a solid electrolyte, a conductive aid and a binder.

A negative electrode active material layer comprises at least $La_xC_{(1.00-x)}$ as the negative electrode active material.

The content of the negative electrode active material in the negative electrode active material layer is preferably higher from the viewpoint of capacity. The mass ratio of the negative electrode active material with respect to the mass of the negative electrode active material layer may be 10 to 90 mass %, and is preferably 20 to 80 mass %.

The solid electrolyte, conductive aid and binder used may be any of those mentioned above under "(Positive electrode active material layer)".

(Negative Electrode Collector Layer)

Examples of materials for the negative electrode collector layer include stainless steel (SUS), copper, nickel, iron, titanium, platinum and carbon. The form of the negative electrode collector layer may be a foil, mesh or porous form.

(Battery Case)

The battery case may be in any form that is able to house the members of a fluoride ion battery, and any battery case commonly employed for batteries may be used.

<Method for Producing Fluoride Ion Battery>

The method for producing a fluoride ion battery of the disclosure includes discharging a fluoride ion battery precursor having $La_xC_{(1.00-x)}$ as the negative electrode active material, where $0.00<x<1.00$, until the upper limit potential of the negative electrode reaches 2.5 V to 3.5 V vs $Pb/PbF_2$.

Simply using $La_xC_{(1.00-x)}$ as the negative electrode active material allows high charge-discharge capacity to be achieved. However, the charge-discharge capacity can be further increased by discharging the fluoride ion battery precursor comprising $La_xC_{(1.00-x)}$, until the upper limit potential of the negative electrode reaches 2.5 V to 3.5 V vs $Pb/PbF_2$.

If discharge is carried out until the potential of the negative electrode reaches the high potential of 2.5 V to 3.5 V vs $Pb/PbF_2$, then presumably the crystal structure of the $La_xC_{(1.00-x)}$ changes to be at least partially amorphous, or the $La_xC_{(1.00-x)}$ particles are broken down into fine particles, thus increasing the reactivity of the $La_xC_{(1.00-x)}$ with fluorine ion.

The $La_xC_{(1.00-x)}$ in the fluoride ion battery precursor may be synthesized by an arc melting method using La and C as starting materials, for example, with optional pulverizing.

The upper limit potential of the negative electrode for discharge of the fluoride ion battery precursor may be 2.5 V vs $Pb/PbF_2$ or greater, 2.6 V vs $Pb/PbF_2$ or greater, 2.7 V vs $Pb/PbF_2$ or greater or 2.8 V vs $Pb/PbF_2$ or greater, and 3.5 V vs $Pb/PbF_2$ or lower, 3.4 V vs $Pb/PbF_2$ or lower, 3.3 V vs $Pb/PbF_2$ or lower or 3.2 V vs $Pb/PbF_2$ or lower.

The method for producing a fluoride ion battery of the disclosure preferably includes charge-discharge so that the upper limit potential of the negative electrode is −0.5 V to 0.5 V vs $Pb/PbF_2$, and the lower limit potential of the negative electrode is −3.0 V to −2.0 V vs $Pb/PbF_2$, before discharge until the upper limit potential of the negative electrode reaches 2.5 V to 3.5 V vs $Pb/PbF_2$.

The upper limit potential of the negative electrode for charge-discharge before discharge until the upper limit potential of the negative electrode reaches 2.5 V to 3.5 V vs $Pb/PbF_2$ may be −0.5 V vs $Pb/PbF_2$ or greater, −0.4 V vs $Pb/PbF_2$ or greater, −0.3 V vs $Pb/PbF_2$ or greater or 0.2 V vs $Pb/PbF_2$ or greater, and 0.5 V vs $Pb/PbF_2$ or lower, 0.4 V vs $Pb/PbF_2$ or lower, 0.3 V vs $Pb/PbF_2$ or lower or 0.0 V vs $Pb/PbF_2$ or lower.

The lower limit potential of the negative electrode for charge-discharge before discharge until the upper limit potential of the negative electrode reaches 2.5 V to 3.5 V vs $Pb/PbF_2$ may be −3.0 V vs $Pb/PbF_2$ or greater, −2.9 V vs $Pb/PbF_2$ or greater, −2.7 V vs $Pb/PbF_2$ or greater or 2.5 V vs $Pb/PbF_2$ or greater, and −2.0 V vs $Pb/PbF_2$ or lower, −2.2 V vs $Pb/PbF_2$ or lower, −2.3 V vs $Pb/PbF_2$ or lower or −2.4 V vs $Pb/PbF_2$ or lower.

EXAMPLES

Examples 1 and 2 and Reference Example 1

Example 1

La and C were weighed out to a molar ratio of La:C=0.33: 0.67, and $La_{0.33}C_{0.67}$ was synthesized as a negative electrode active material using an arc melting method.

$CaF_2$ and $BaF_2$ were then mixed for 20 hours with a ball mill at 600 rpm, to synthesize $Ca_{0.5}Ba_{0.5}F_2$ as a solid electrolyte.

The synthesized $La_{0.33}C_{0.67}$ was pulverized to 100 μm or smaller with a mortar, and then the $La_{0.33}C_{0.67}$ and $Ca_{0.5}Ba_{0.5}F_2$ were mixed together with vapor-grown carbon fiber (VGCF) as a conductive aid to a weight ratio of 3:6:1, for 10 hours using a ball mill at 200 rpm, to prepare a negative electrode mixture.

For the positive electrode mixture, $PbF_2$ as a positive electrode active material and acetylene black as a conductive aid were weighed out to a weight ratio of 95:5, and mixed for 3 hours with a ball mill at 600 rpm.

A Pt foil as a negative electrode collector layer, the negative electrode mixture as a negative electrode active material layer, the solid electrolyte as a solid electrolyte layer, the positive electrode mixture as a positive electrode active material layer and a Pt foil as a positive electrode collector layer, were stacked in that order to fabricate a fluoride ion battery for Example 1.

Example 2

A fluoride ion battery for Example 2 was fabricated in the same manner as Example 1, except that La and C were weighed out to a molar ratio of La:C=0.40:0.60. In other words, the negative electrode active material used in the fluoride ion battery of Example 2 was $La_{0.40}C_{0.60}$.

Reference Example 1

A fluoride ion battery for Reference Example 1 was fabricated in the same manner as Example 1, except that La was used as the negative electrode active material.

<Charge-Discharge Test>

The fluoride ion batteries of Examples 1 and 2 and Reference Example 1 were subjected to constant current charge-discharge for 3 cycles at 200° C. with a current of 50 µA, until the upper limit potential of the negative electrode reached 0.00 V vs $Pb/PbF_2$ and the lower limit potential of the negative electrode reached −2.5 V vs $Pb/PbF_2$.

Figure 2:
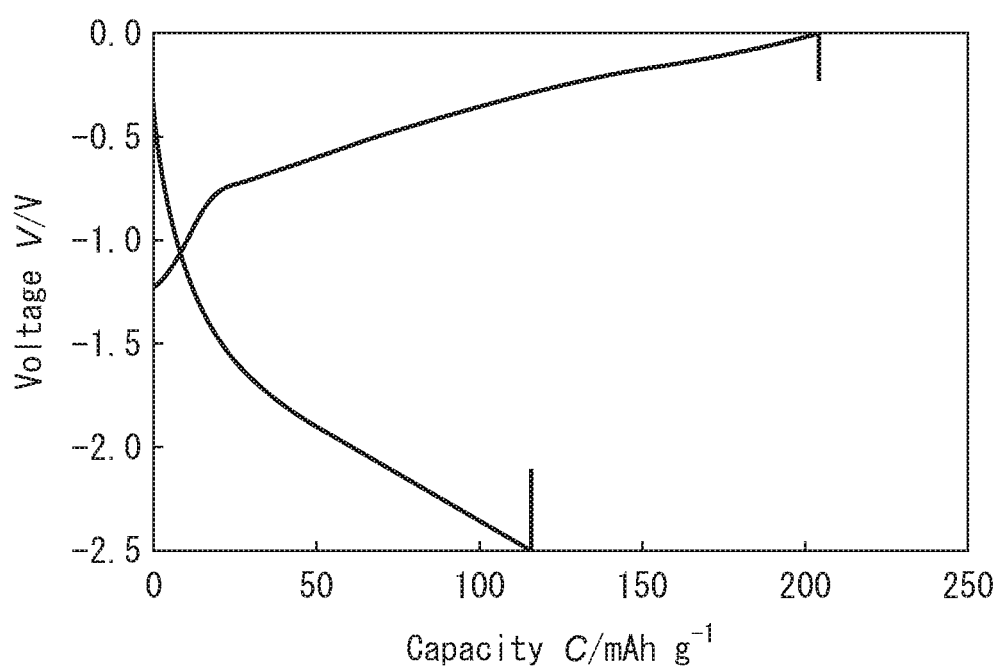
FIG. 2 is a graph showing the charge-discharge characteristic for the fluoride ion battery of Example 1.
Figure 3:
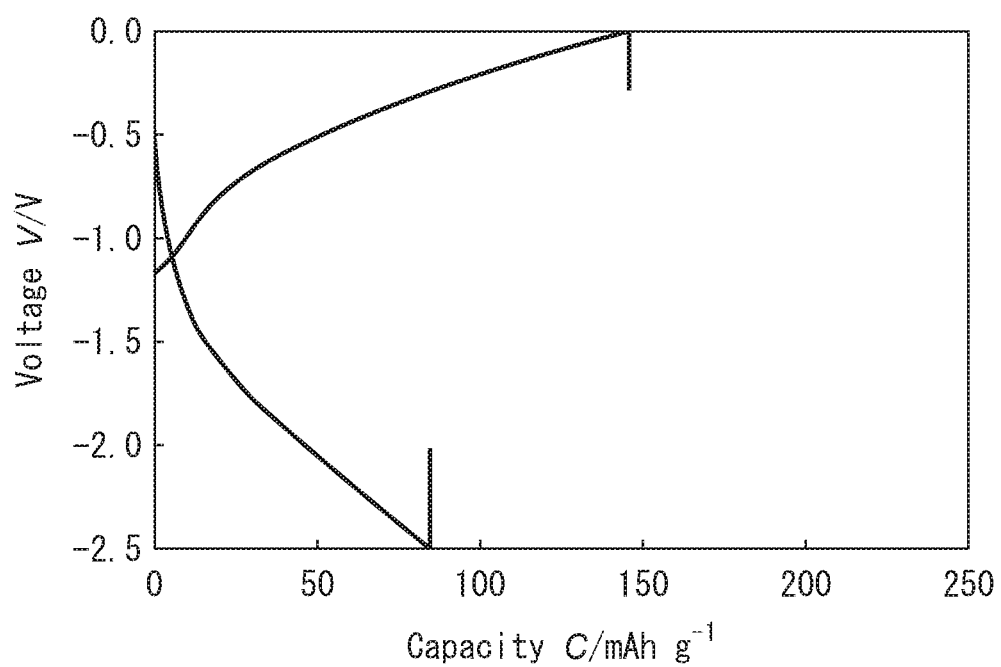
FIG. 3 is a graph showing the charge-discharge characteristic for the fluoride ion battery of Example 2.
Figure 4:
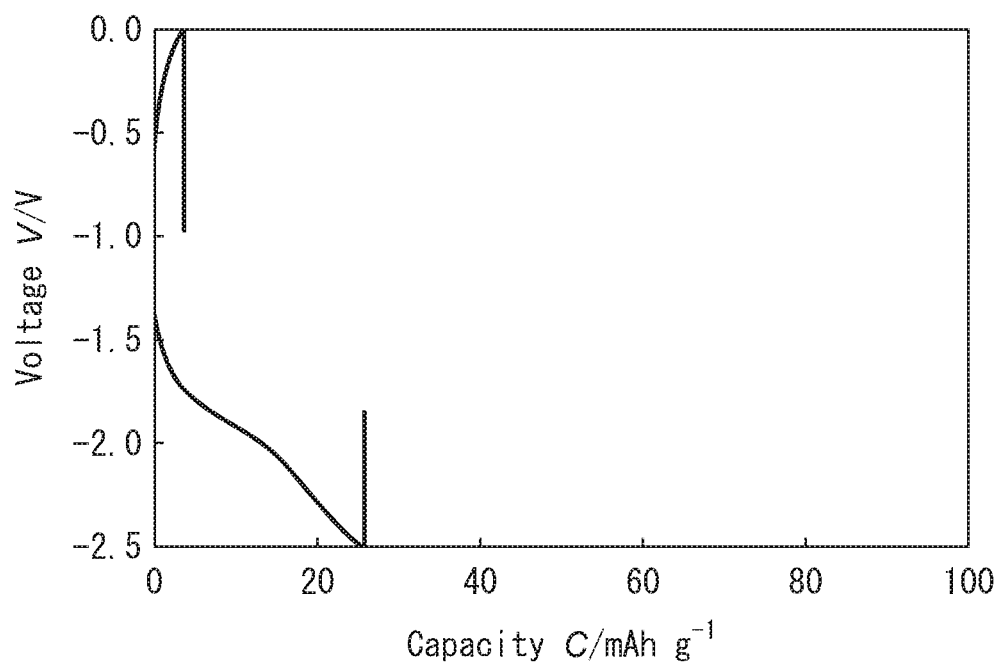
FIG. 4 is a graph showing the charge-discharge characteristic for the fluoride ion battery of Reference Example 1.

The charge-discharge curves of each of the fluoride ion batteries are shown in FIGS. 2 to 4. FIG. 2 is a graph showing the charge-discharge characteristic for the fluoride ion battery of Example 1. FIG. 3 is a graph showing the charge-discharge characteristic for the fluoride ion battery of Example 2. FIG. 4 is a graph showing the charge-discharge characteristic for the fluoride ion battery of Reference Example 1.

As seen in FIGS. 2 to 4, the fluoride ion battery of Example 1 which used $La_{0.33}C_{0.67}$ as the negative electrode active material and the fluoride ion battery of Example 2 which used $La_{0.40}C_{0.60}$ as the negative electrode active material exhibited higher charge-discharge capacity than the fluoride ion battery of Reference Example 1 which used La as the negative electrode active material.

Examples 3 and 4

<Charge-Discharge Treatment>

The charge-discharge tested fluoride ion battery of Example 1 was charged until the upper limit potential of the negative electrode reached 3.00 V vs $Pb/PbF_2$, and was used as a fluoride ion battery for Example 3.

Similarly, the charge-discharge tested fluoride ion battery of Example 2 was charged until the upper limit potential of the negative electrode reached 3.00 V vs $Pb/PbF_2$, and was used as a fluoride ion battery for Example 4.

<Charge-Discharge Test>

The fluoride ion batteries of Examples 3 and 4 were subjected to charge-discharge testing.

Figure 5:
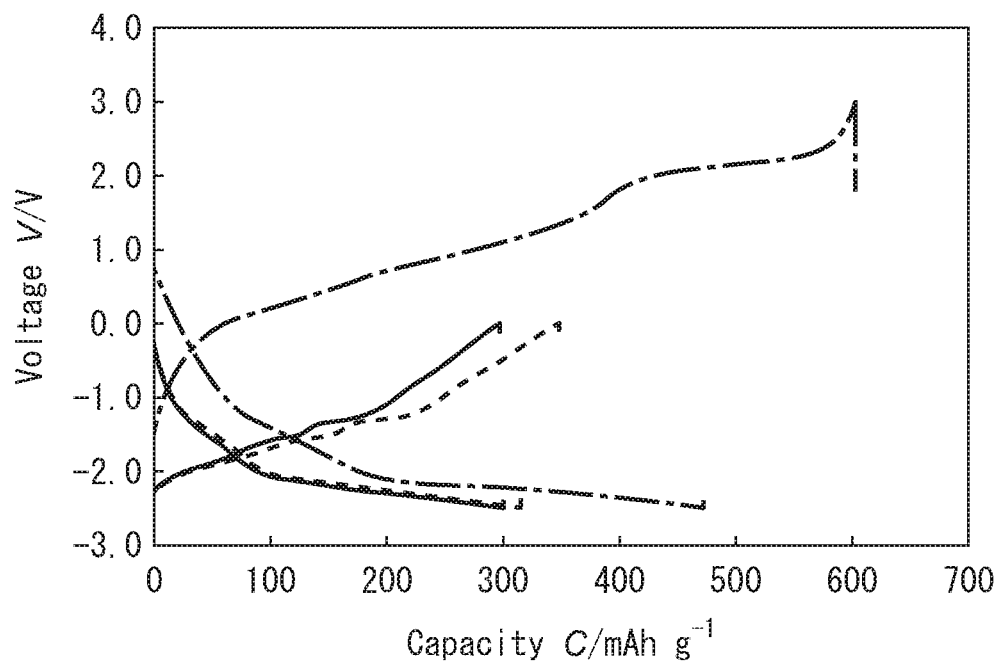
FIG. 5 is a graph showing the charge-discharge characteristic for the fluoride ion battery of Example 3.

The charge-discharge curve of the fluoride ion battery of Example 3 is shown in FIG. 5. The charge-discharge curve of the fluoride ion battery of Example 4 is shown in FIG. 6.

Figure 6:
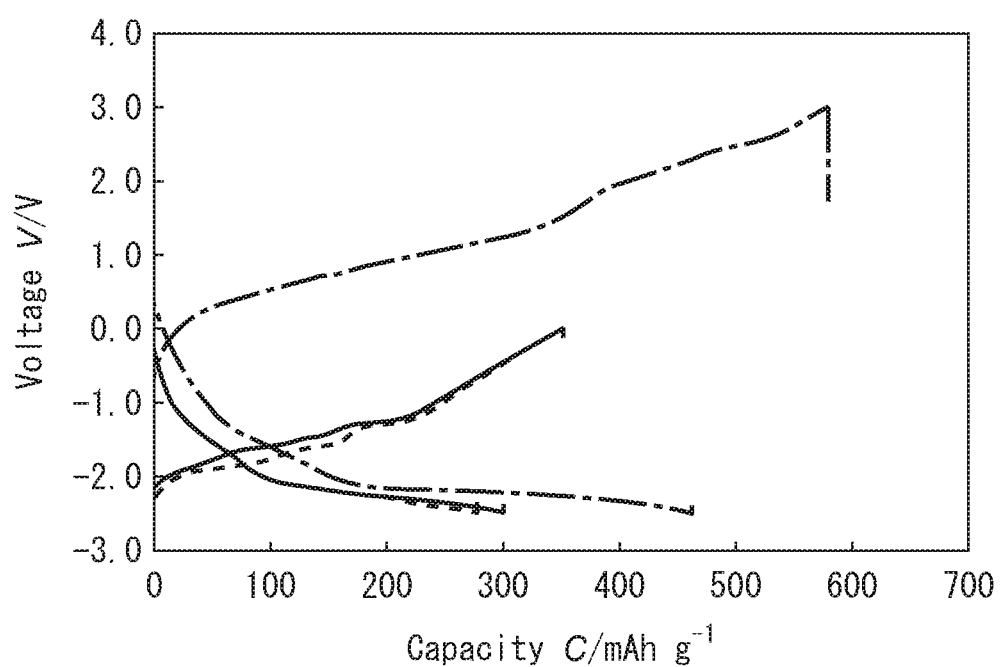
FIG. 6 is a graph showing the charge-discharge characteristic for the fluoride ion battery of Example 4.

As shown in FIGS. 5 and 6, the fluoride ion batteries of Examples 3 and 4 that were charged until the upper limit potential of the negative electrode reached 3.00 V vs $Pb/PbF_2$ exhibited charge-discharge capacities of 300 mAh/g or greater, which were higher charge-discharge capacities than the fluoride ion batteries of Examples 1 and 2 that were not charged until the upper limit potential of the negative electrode reached 3.00 V vs $Pb/PbF_2$.

REFERENCE SIGNS LIST

1 Fluoride ion battery
10 Positive electrode collector layer
20 Positive electrode active material layer
30 Electrolyte layer
40 Negative electrode active material layer
50 Negative electrode collector layer

The invention claimed is:

1. A fluoride ion battery having $La_xC_{(1.00-x)}$ as a negative electrode active material, where $0.00<x<1.00$.

2. The fluoride ion battery according to claim 1, where $0.30 \leq x \leq 0.45$.

3. The fluoride ion battery according to claim 1, which has a lanthanoid fluoride as a solid electrolyte.

4. The fluoride ion battery according to claim 1, wherein a charge-discharge capacity is 300 mAh/g or greater.

5. A method for producing a fluoride ion battery, which includes discharging a fluoride ion battery precursor having $La_xC_{(1.00-x)}$ as a negative electrode active material, where $0.00<x<1.00$, until the upper limit potential of a negative electrode reaches 2.5 to 3.5 V vs $Pb/PbF_2$.

6. The method for producing a fluoride ion battery according to claim 5, which includes charge-discharge so that the upper limit potential of the negative electrode is −0.5 V to 0.5 V vs $Pb/PbF_2$, and the lower limit potential of the negative electrode is −3.0 V to −2.0 V vs $Pb/PbF_2$, before discharge until the upper limit potential of the negative electrode reaches 2.5 V to 3.5 V vs $Pb/PbF_2$.

* * * * *